March 12, 1940.  H. A. FLOGAUS ET AL  2,193,317
AUTOMATIC TRANSMISSION AND CONTROL
Filed Oct. 7, 1936  9 Sheets-Sheet 4

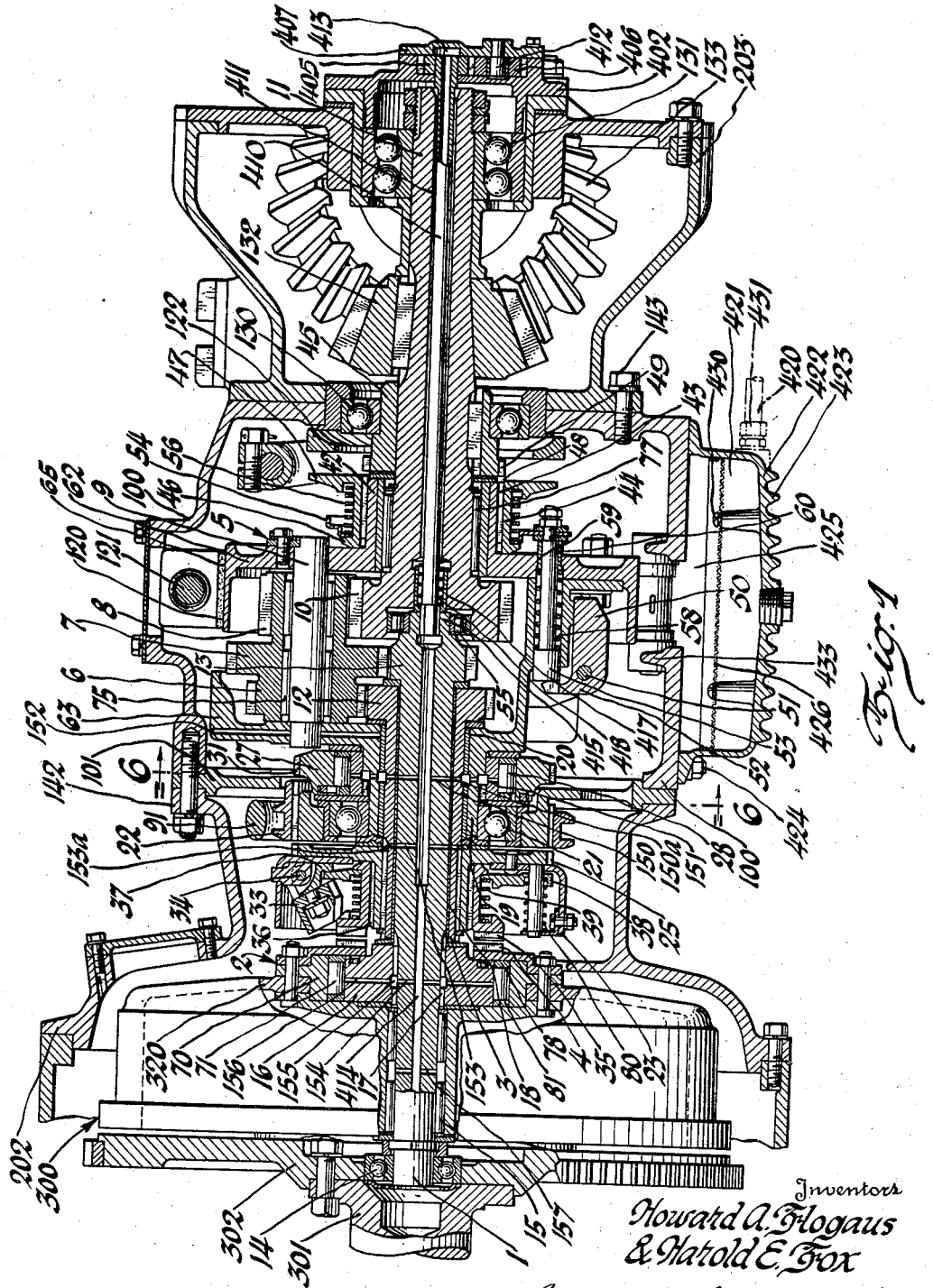

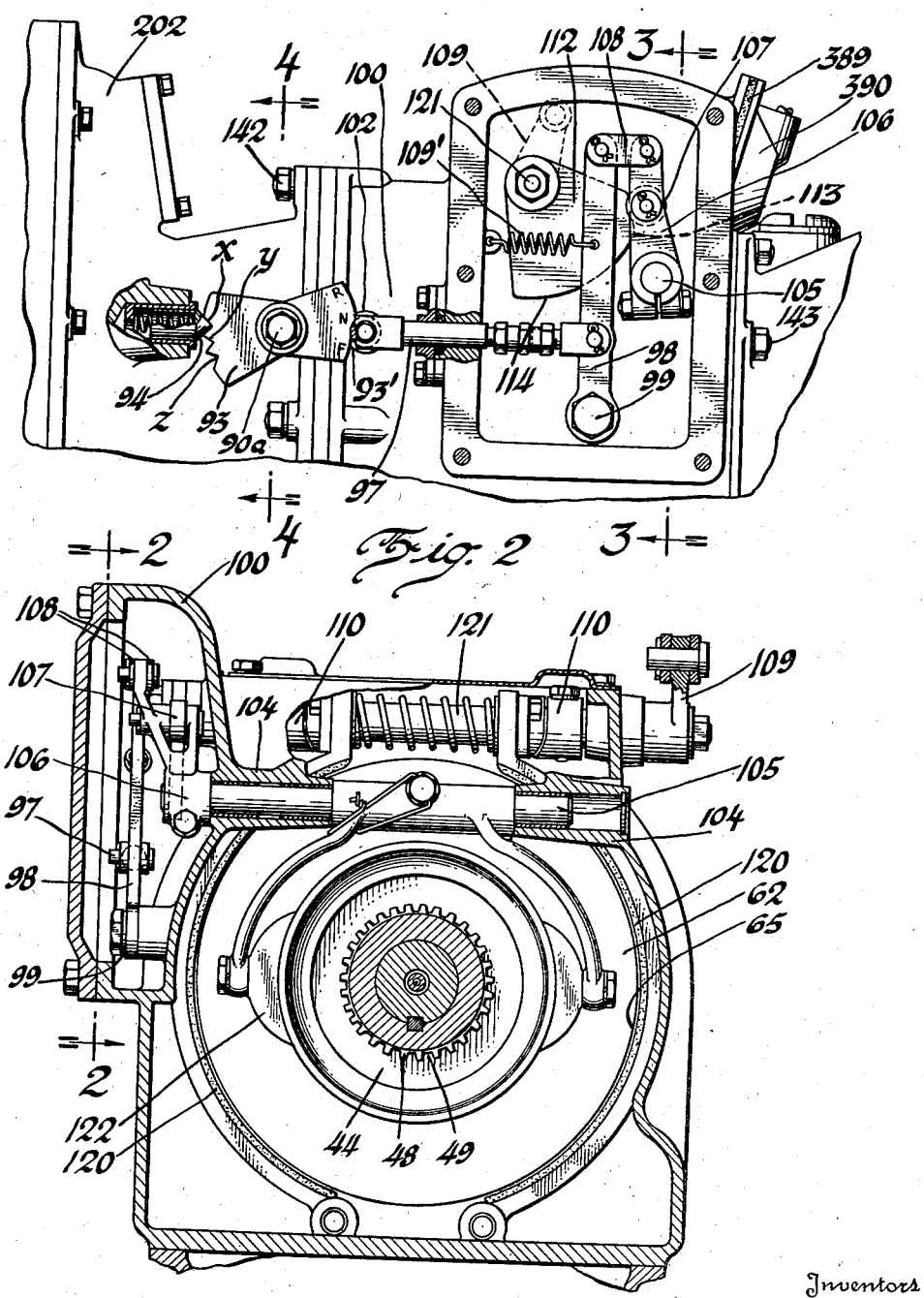

Inventors
Howard A. Flogaus
& Harold E. Fox
By Blackmore, Spencer & Flint
Attorneys March 12, 1940.   H. A. FLOGAUS ET AL   2,193,317
AUTOMATIC TRANSMISSION AND CONTROL
Filed Oct. 7, 1936   9 Sheets-Sheet 5

Inventors
Howard A. Flogaus &
Harold E. Fox
By Blackmore, Spencer & Flint
Attorneys

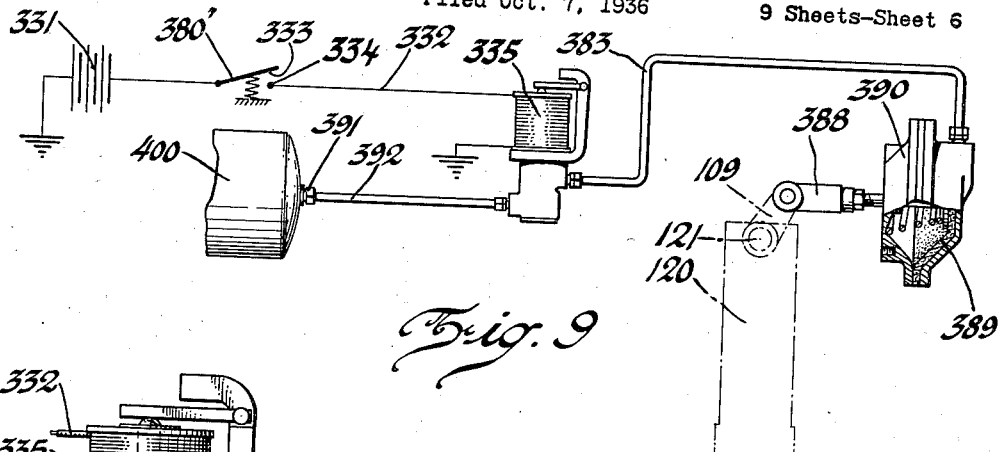
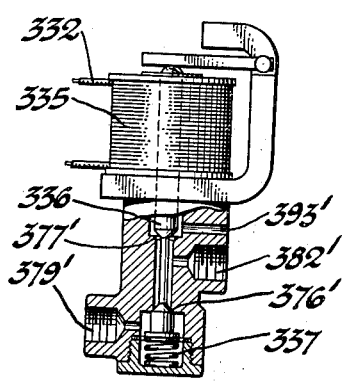
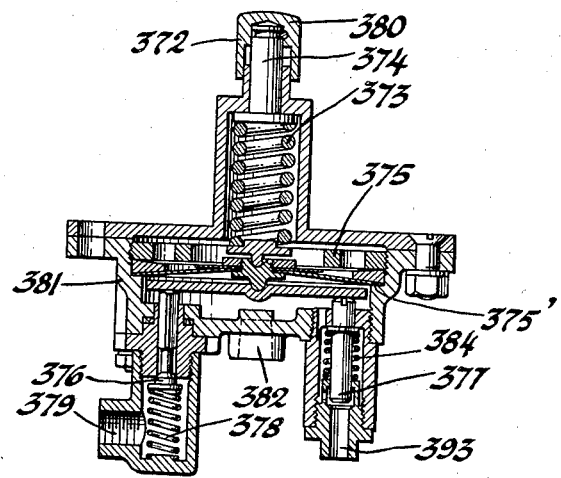
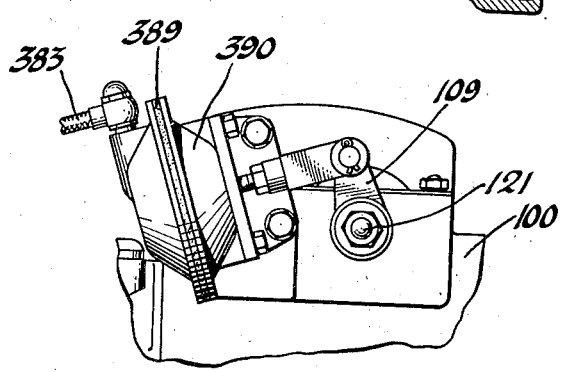

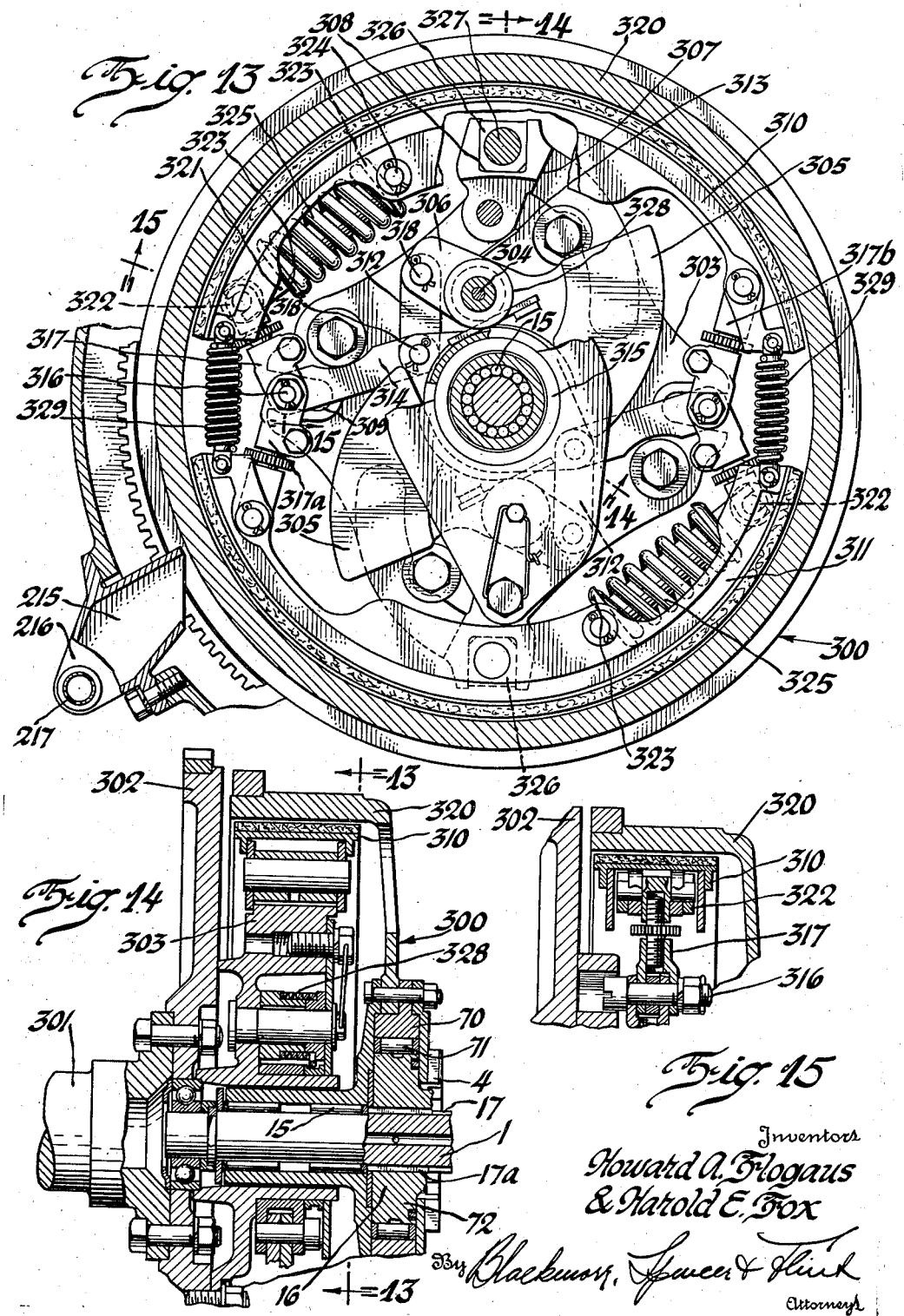

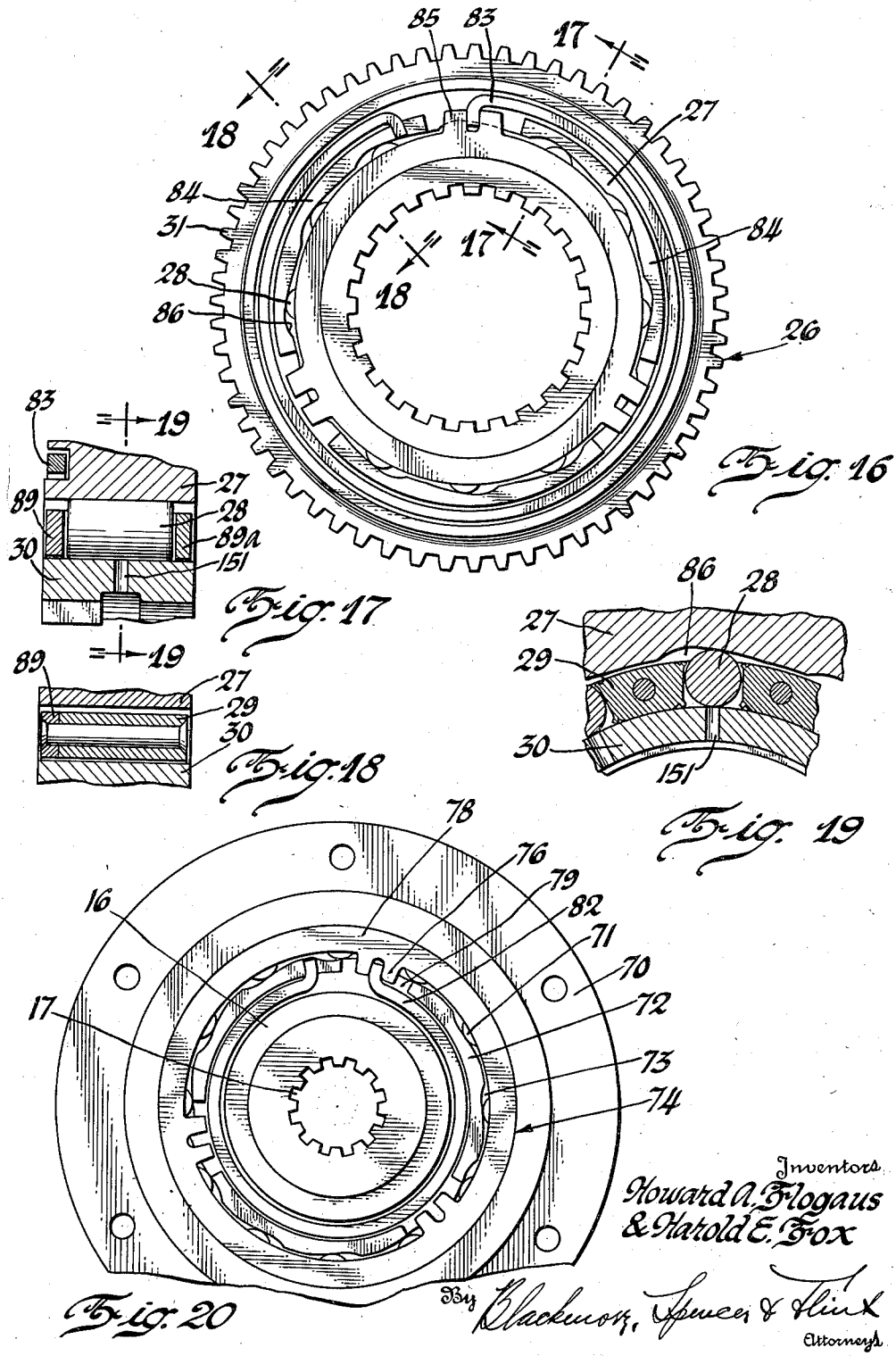

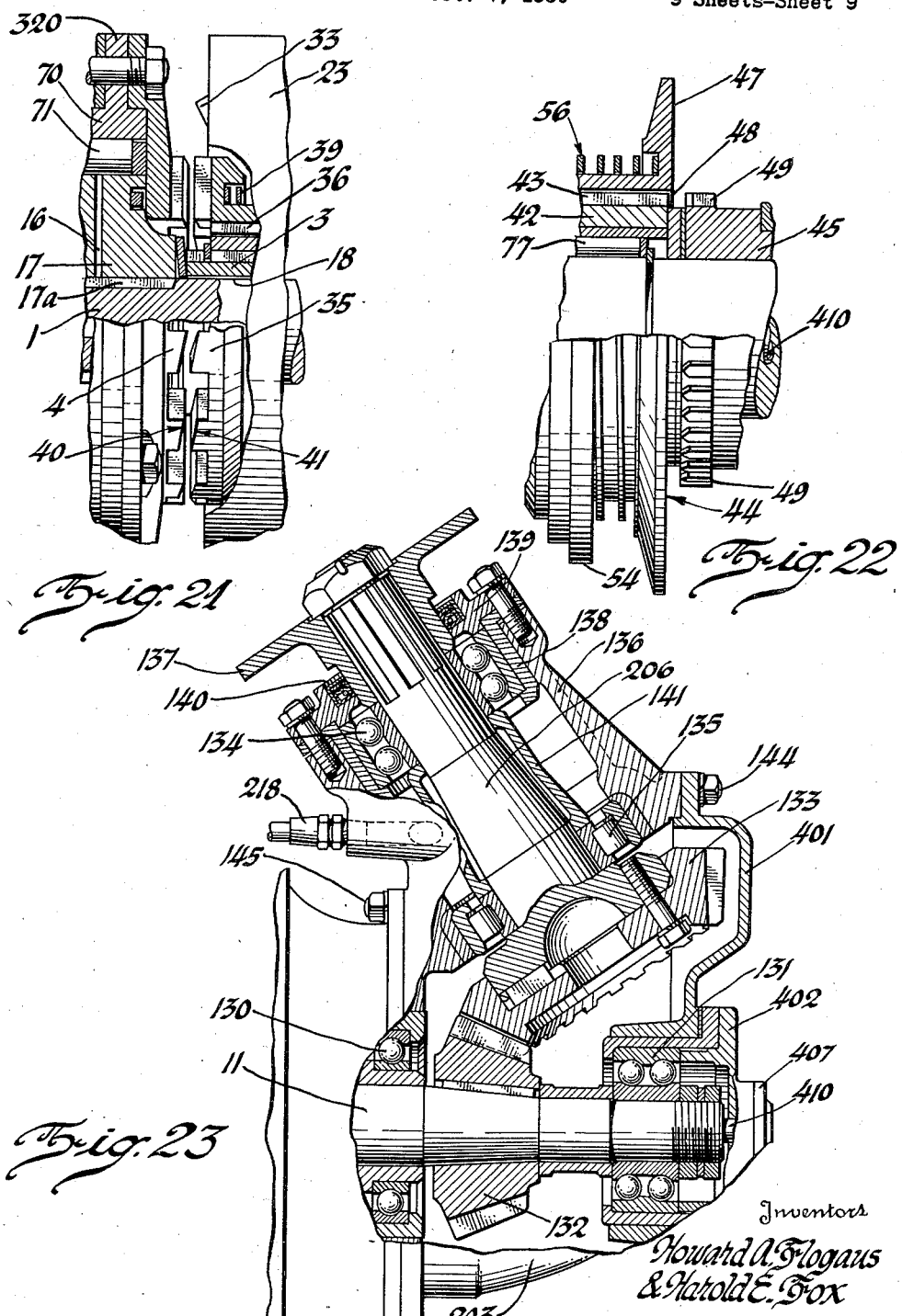

Patented Mar. 12, 1940

2,193,317

UNITED STATES PATENT OFFICE 2,193,317

AUTOMATIC TRANSMISSION AND CONTROL

Howard A. Flogaus, Pleasant Ridge, and Harold E. Fox, Pontiac, Mich., assignors to General Motors Corporation, Detroit, Mich., a corporation of Delaware Application October 7, 1936, Serial No. 104,422

25 Claims. (Cl. 74—260)

The principal object of our invention is to provide an automatic power transmission mechanism for vehicles and other power delivery purposes, which possess new factors for safety and improvement in the operator's ability to master and overcome automatic speed ratio change devices under various operating conditions.

A second object is the combining of such controls, obedient to the will of the operator such that a number of otherwise plural controls are subject to unitary elements, thus permitting the operator stationed at a remote point from the power plant and transmission assembly, to command an entire regime of responses both from the power plant, and the automatically operating transmission with a minimum of effort, and numbers of interconnecting elements between the master control station and the power plant station.

A third object is the combining of simple manual movement of operator-operable controls, with auxiliary power mechanisms which multiply such movement, in an unique manner, to control and actuate both power plant and self-selecting transmission mechanism.

The present invention further embraces improvements in transmission construction, lubrication and controls, and in clutches arranged to establish various torque paths under operating conditions involving automatically selected gear shift, especifically demonstrated by an example applied to gearings of the planetary type. The invention discloses means to overcome present difficulties in automatically shifted gearings where self-applying clutches are used, wherein frequent failures occur because of faulty lubrication, and because of clutches inadequate to sustain shock load and torque impulse.

Our invention discloses particular principles wherein clutches required to engage and disengage under automatic shift controls are arranged to run free under favorable lubricant conditions, and to engage at or near synchronism with a cushioned effect, without excessive intermediate drag and with proper flushing for cooling and for washing away particles of foreign matter such as chips of metal and dirt.

It further discloses novel arrangements in the disposition of power plant mechanism, with particular advantages in operation from placement and drive of forced-feed lubrication, not only for the feeding of oil to the clutches aforementioned, but also for the proper lubrication of the gearing as a whole.

Further novel features are shown in my provisions for guaranteeing the cleanliness of the circulating lubricant and the methods for quick servicing of the lubricant system.

The importance of the disclosures is their provision against failures in torque-carrying systems wherein special precautions are necessary because of the well-known characteristics of automatically shifted gearings to build up stresses under certain operating conditions beyond those encountered in manually shifted systems. This is because automatic shifted devices; for example, those having speed governor control, are not conscious of other operating functions such as load, gradient, and operator demand for acceleration.

Of further importance is the arrangement for remote control of the above described devices so that an operator placed at the forward end of a vehicle, and thereby handicapped by having no ready hearing or feeling so as to be advised of the functioning of the power plant placed at the rear of the vehicle, will need a minimum of control connections to the transmission mechanism, and may rely on the self operation, not only of speed change shift, but also the clutching and lubrication systems.

These practical benefits are demonstrably realized in passenger carrying busses and rail cars, as well as in side loading trucks all arranged for most economical location of driver's compartment and power plant.

With these and other objectives as will appear in the following specifications and claims, and the subjoined drawings, we now describe the subject matter of our disclosures.

Figure 1 is an elevation section of the main clutch, automatic transmission and final drive conversion gear assemblies, the engine being to the left and the load shaft or output elements to the right.

Figure 2 is an external elevation view taken at line 2—2 of Figure 3 showing the operator-operable control mechanism, and the inter-connecting elements with the automatic shifting mechanism.

Figure 3 is a vertical section of the automatic transmission unit taken at line 3—3 of Figure 2.

Figure 9 schematically describes the general form of manually selected control, servo-actuating the carrier brake of Figure 1, the relay means of the showing being electrical. Figure 10 shows the section of the electrical relay means of Figure 9.

Figure 11 is the sectional view of a fluid-servo valve alternate to the relay of Figures 9 and 10. Figure 12 is a view of the fluid pressure motor of Figure 9 showing the connections to the elements of Figures 1 and 2.

Figure 13 is a sectional view of the centrifugal main clutch shown in side elevation in Figure 1, and in longitudinal section in Figure 14. In Figure 13, the final drive oiling source and connections are shown. Lines 13—13 of Figure 14 indicate the points where the section of Figure 13 is taken. Figure 15 is a section taken at 15—15 of Figure 13. The section of the low speed roller clutch of Figure 1 is shown in Part in Figure 14.

Figure 6:
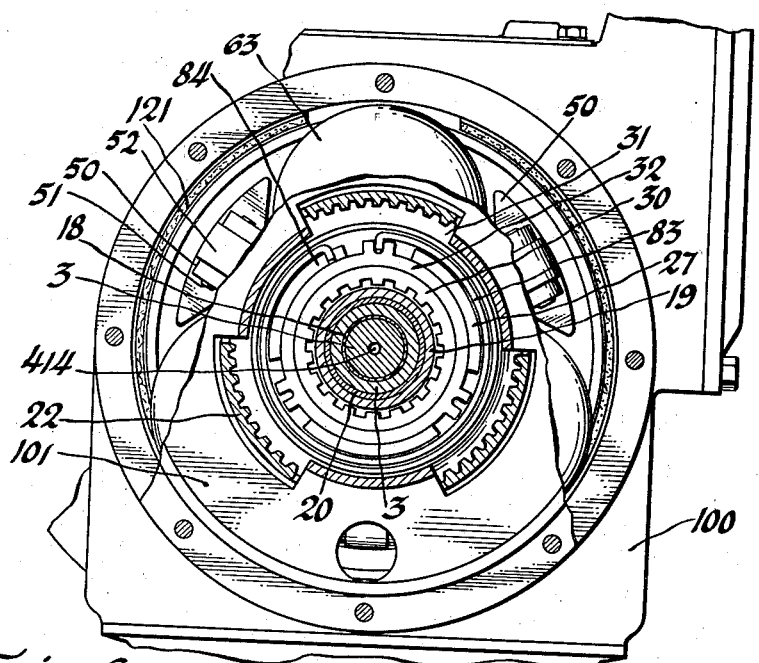
Figure 6 is a sectional view of the automatic transmission unit taken at 6—6 of Figure 1, showing the mounting of the forward, neutral, reverse shifter means, and the associated reaction supporting clutch.

Figure 16 is an elevation view of the reaction roller clutch of Figures 1 and 6. Figure 17 is taken at 17—17 and Figure 18 at 18—18 of Figure 16. Figure 19 is a section at lines 19—19 of Figure 17.

Figure 20 is a similar view of the low speed roller clutch of Figures 1 and 14.

Figure 21 is an enlarged sectional view of the 2nd speed clutching arrangement of Figure 1.

Figure 22 is a similar enlarged sectional view of the direct drive clutching arrangement of Figure 1.

Figure 5:
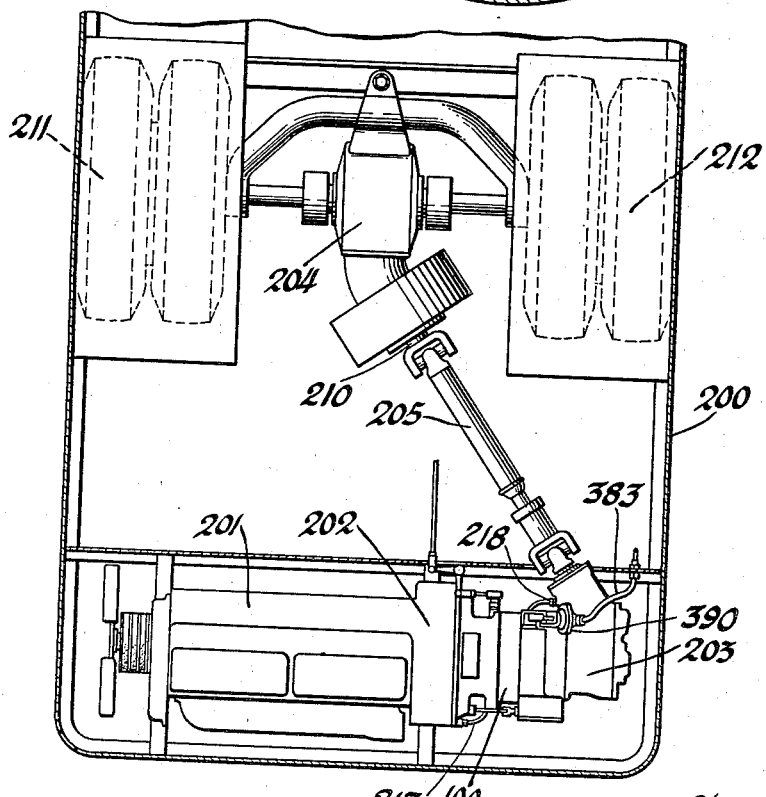
Figure 5 is a plan view of a passenger vehicle such as a bus, showing the mounting of the engine, clutch, automatic transmission and final drive conversion gear transversely in the vehicle, at the rear; and the angular drive to the differential assembly and the rear wheels.

Figure 23 represents a horizontal section of the final drive conversion shown in outline in Figure 5, the elements given being installed in casing 203 of Figure 5.

In Fig. 5 the frame of the vehicle is indicated by 200, the engine assembly by 201, the clutch housing is 202, the primary transmission casing is at 100 and the secondary transmission casing by 203. The rear axle housing is indicated by 204 and the final drive shaft 205 delivers torque to the differential mechanism, through the final transmission shaft 210. The differential mechanism is of ordinary type and drives the rear wheels 211 and 212.

The plan and layout of this disposition of the elements of the power plant drive do not constitute invention as claimed in the presently submitted specification, and said inventive combinations are covered in U. S. S. N. 731,669 filed June 21, 1934, now matured as U. S. 2,037,464.

The driving elements will be described in sequence from the engine, and are shown in Figure 1.

In Figures 13 and 14 the centrifugal clutch assembly 300 connects engine shaft 301 to member 320 at all engine speeds above a predetermined minimum. The input power element of the clutch is a spider plate or carrier 303 bolted to engine speed shaft 301 through flywheel 302 and acting as a support for weights 305, through lever linkage and friction shoes 310 and 311. The output power element of the clutch is drum 320, fixed to rotate with jaw clutch 4 and supported on bearing 15 on shaft 1 of Figure 1.

The drum 320 carries attached flanged race 70 inside which over-running clutch rollers 71 may engage. The cam plate 72 shown in detail in Figure 20 has pockets 73 in which the rollers 71 are retained, and it is fastened to low speed shaft 1 by keys, splines 17—17a or other convenient means.

Intermediate bronze cage 74 shown in Figure 20 is riveted to flanges 78 having lugs 76 which intersect lugs 79 cut on the lateral face of plate 72. Flange 81 shown in Figure 1, is formed integral with cage 74 and pockets 73. Spring 82 is turned to fit lug space of 79 and 76 and biases cage 74 so as to load rollers 71 on the cams of 72 for locking under relative rotation forwardly.

The planetary carrier 5 has two webs 62—63 at either end and the extension of web 62 may act as a brake drum surface 65. The webs are supported in bearings 21 and 77. Planet shafts 9 are locked to the webs 62—63 with their axes parallel to the main centerline of the transmission. Roller bearings 75 support the planet bodies 6—7—8 on shafts 9.

The centrifugal friction clutch to be described later serves as the main clutch, arranged to establish drive at low engine speed, and carries all the driving torque at all driving intervals to shaft 1 through roller clutch 2 or to hollow shaft 3 through jaw clutch 4. Low speed sun gear 13 is integral with shaft 1.

The planet cage 5 carries triplicate planets 6—7—8 rotating on shafts 9. Output sun gear 10 is fixed to the transmission tailshaft 11. Second speed sun gear 12 is fixed to hollow shaft 3. The sun gears 13—12—10 are constantly meshed with the planets 6—7—8.

The engine flywheel 302 is shown at the left in Figure 1, pilot bearing 14 aligning and supporting the end of shaft 1. A hollow sleeve portion of the centrifugal main clutch assembly 300 surrounds the adjacent portion of shaft 1, where roller bearings 15 support the shaft in the sleeve.

Roller clutch cam plate 16 has internal splines 17 meshing with splines 17a cut on shaft 1. Bushings 18 support hollow shaft 3 on shaft 1. An extension 19 of the carrier 5 supports hollow shaft 3 through bushing 20, and is mounted in web 101 of casing 100 through ball bearing 21.

Slider 22 is slidingly mounted on web 101 of the casing 100, and is arranged to lock either of two toothed elements to the casing for non-rotation, as a reaction sustaining means.

Webbed drum 23 is riveted to hollow shaft 3 and carries peripheral teeth 25 which may mesh with teeth of slider 22. Reaction roller clutch 26 consists of cam plate 27 integral with teeth 31, rollers 28, cage 29 and race ring member 30. Bronze cage 32 aligns the rollers 28 in their pockets 86 and has riveted flange 89 with lug 85 intersecting lugs 84 of 27.

Spring 83, similar to spring 82, exerts a biasing force, loading the cage 32 directionally through lugs 84 and 85. The roller cam spaces 86 permit egress of oil under pressure as will be explained later. The detail is described in Figures 16, 17, 18, and 19.

For forward speed drive, slider element 22 is in the right hand position of Figure 1 and prevents clutch teeth 31 from rotating. The inner member 30 of one-way clutch 26 is fixed to rotate with the carrier or cage 5, on extension 19.

The second speed hollow shaft 3 carries drum 23 on which are pivoted weights 33 at 34. Jaw clutch 35 is splined to member 23 at 36 for limited longitudinal motion, and may mesh with jaw clutch 4 or run free.

Weights 33 act through cam arms 37 and thrust collar 38 and springs 39 to load the jaw clutch 35 axially for engagement with jaw clutch 4 fixed to the output member of the main (centrifugal) clutch. The approaching faces of jaws 4—35 are inclined as at 40—41 in Figure 21.

Initial forward drive from the engine passes through:

a. Centrifugal main clutch 300
b. One-way roller clutch 2
c. Solid shaft 1
d. Sun gear 13
e. Planets 7—8
f. Output sun gear 10

Retrograde rotation of the carrier 5 is prevented by reaction roller clutch 26 and jaw clutch 22—31.

Because of the gear ratios of the low and 2nd speed suns 13—12 with the plants 6—7 while the low speed sun 13 is driving, the 2nd speed sun gear 12 and teeth 35 are moving at less speed than the low speed gear sun 13 or the engine connected jaw clutch 4 so that if the weights 33 try to mesh jaw clutch 35, the inclined faces 40—41 will reject mesh.

When relaxing of the throttle occurs, the engine shaft decelerates, one-way clutch 2 releasing, and jaw clutch 4 may come to synchronism with jaw clutch 35 and mesh under the force of weights 33 through springs 39. The reversal of reaction on the carrier or cage 5 speeds up this action, since when it runs forward, 2nd speed sun gear will accelerate.

Jaw clutches with inclined teeth are commonly known in the machine arts. Once engaged, jaw clutch 4—35 carries torque on the longitudinal flat sides of the teeth, and is no longer overrunning, but drives in both directions.

Now low speed sun 13 and shaft 1 idle, since when drive passes through the 2nd speed torque path, consisting of elements 35, 23, 24, 3—12—6—8—10 the sun and shaft are released by the overrunning of clutch 2.

The only way the device can now return to low gear drive is for the weights 33 to collapse due to falling off of engine speed, and springs 80 will release the 2nd speed jaw clutch 4—35, whereupon freewheeling drive through roller clutch 2 and low speed sun 13 may be resumed.

The carrier or cage member 5 at the rear of the transmission has extension 42 splined at 43 mounting jaw clutch slider 44, which may move longitudinally to engage jaw clutch 45 fixed to the output shaft 11.

Slider 44 is integral with flanges 46 and 47. Weights 50 are pivoted at 51 to carrier 5, their cam arms 52 being arranged to move plungers 53 slidingly mounted in the body 62 of element 5. Plungers 53 are attached to collar 54 which extends inwardly toward the shaft center of 11, to intersect spring 56 between flange 46 and the adjacent end of 56. Springs 58 react to the force of weights 50, being held at 59 by capsule 60 fitted in web 62 of carrier 5.

Weights 50 may move outward under centrifugal force, compress springs 58—56 and urge the slider teeth 48 into engagement with the output clutch jaw teeth 49, chamfered with inclined bevels as in Figure 22.

It has been stated that the cage or carrier 5 was prevented from retrograde rotation by one-way roller clutch 26. The next point of importance is how the carrier receives sufficient speed to drive the weights 50 which load slider 44 for engagement.

While the engine is driving the vehicle in second speed, the roller clutch 26 locks, but when the car drives the engine, the carrier 5 tends to rotate forward from zero speed, since the force from 10 establishes sun gear 12 as a temporary reaction point.

Relaxing of the engine accelerator pedal permits this to occur, whence the coming up to a forward speed of the carrier 5 equivalent to existing output shaft speed provides synchronism for the beveled jaw clutch members 48—49 whence they engage, being loaded by weights 50 through spring 56.

As soon as this occurs, a rigid couple is established between the engine connected shaft 13, the carrier 5 and the output shaft 11, causing all gears to rotate together at unit speed. This constitutes direct drive.

Manual means to disconnect the direct drive clutch 44—45 against the action of the governor weights 50, enable the car driver to shift "down" to 2nd at any time. Instead of a main clutch pedal, the 2nd speed forced shift is controlled by a pedal in its place to be further described. If the pedal is depressed, the weights 50 cannot affect direct drive, but if the pedal be pushed out and relaxed, the weights 50 may establish direct drive again upon momentary reversal of torque and sufficient speed of the cage 5 as will be described later.

Direct drive can be continued as long as there is sufficient speed of weights 50 to retain the jaw clutch teeth 48—49 in engagement. Relaxed accelerator pedal will, however, remove torque from the flat sides of the jaw teeth, and at a given critical speed in deceleration, the weights 50 will collapse aided by spring 58, shifting the movable jaw clutch 44 out of mesh with 45. There will be no drive, and the carrier will "float" until the engine is brought up to a speed which causes the carrier to attempt to rotate backward, whereupon reactor roller clutch 26 will lock, and second speed will be established through the torque path described preceding.

If the vehicle speed has been allowed to drift below the mesh-sustaining point of weights 33 of jaw clutch 35, the transmission speed ratio will shift down another step, and low gear drive will be set up through roller clutch 2, shaft 1, and sun gear 13.

At low engine speeds, the centrifugal "main" clutch disconnects the engine entirely from the drive.

Slider 22 may be positioned so that it no longer immobilizes outer ring 31 of roller clutch 26, which thereupon changes the drive from forward to neutral. The roller clutch 26 can no longer serve as a reactor. Now if 22 is moved so that teeth 22—25 are engaged, hollow shaft 3, sun gear 12 and jaw clutch 35 must stand still, since the slider 22 is fixed non-rotatably to the web 101.

When power be applied through the main centrifugal clutch through roller clutch 2, shaft 1 and sun gear 13 the cage 5 is free to rotate, but sun gear 12 now is fixed to the web 101 and acts as a reaction member. The resultant rotation of planets 6—7—8 caused by power applied to 13 and reaction from 12 is now negative and the planets drive output sun 10 reversely. The gear action now is truly "planetary" in that a planetating rotation relationship exists among the elements. The carrier 5 rotates backward and planet 8 provides a net reverse rotation to meshing sun gear 10.

It should be noted that weights 33 are inactive when 3—12—24—23 are non-rotating.

Figure 4:
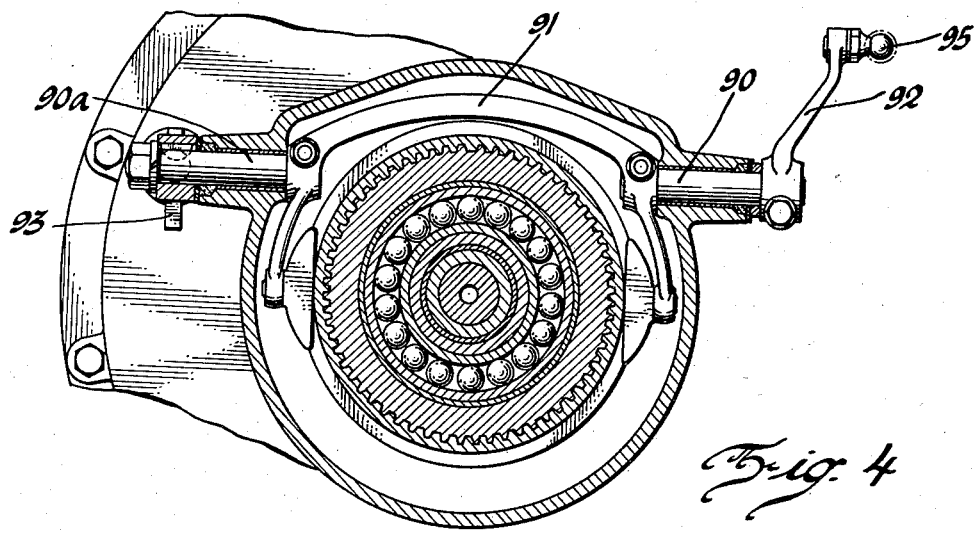
Figure 4 is a vertical section of the automatic transmission unit taken at 4—4 of Figure 2 and shows the detail of the manual selection mechanism for forward, neutral and reverse.
Figure 8:
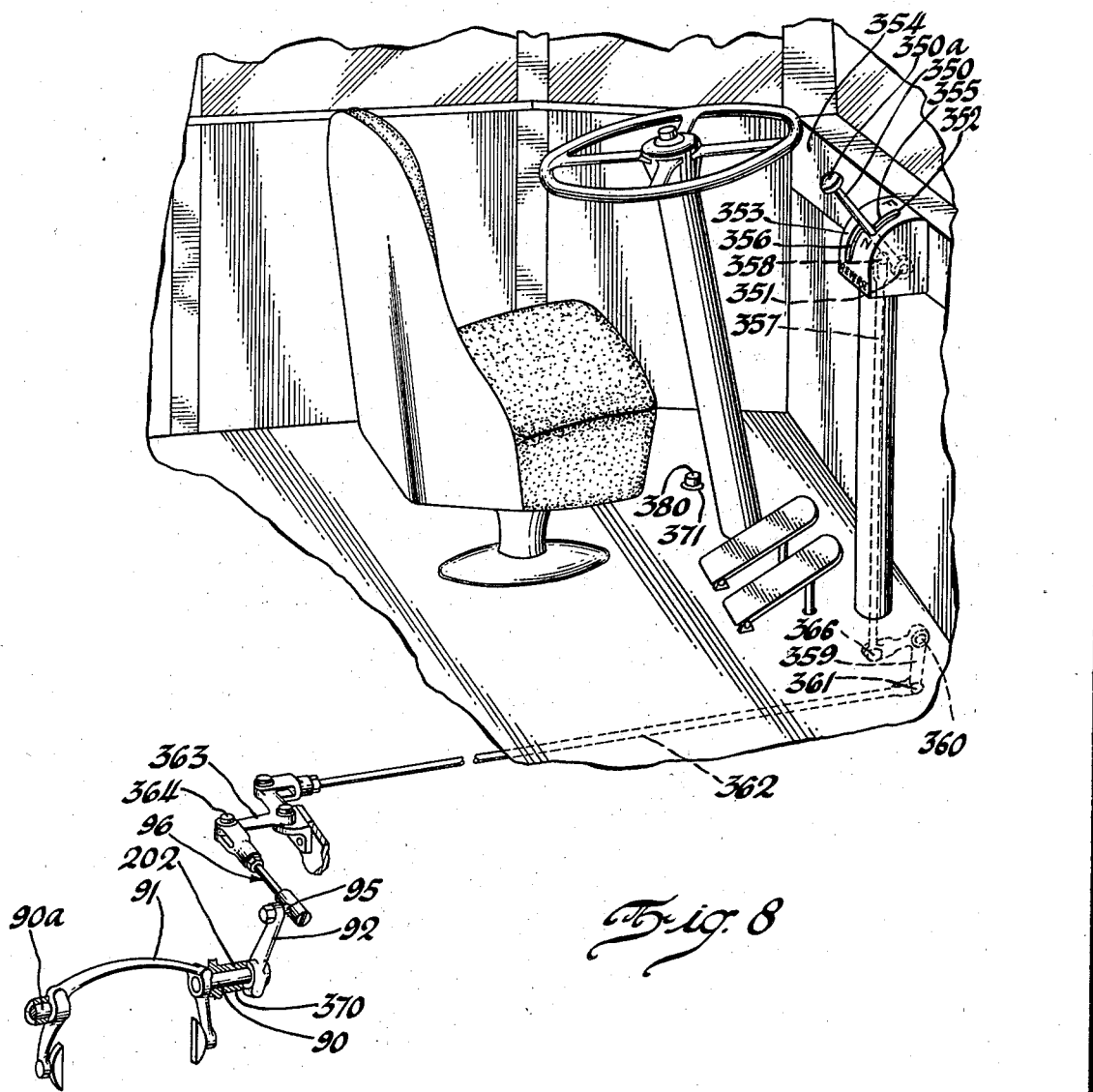
Figure 8 is a view of the driver's compartment of a vehicle such as a bus, equipped with the subject matter of the invention, in particular, the driver's controls, and their connection to the ratio shifter mechanism.

The forward-neutral-reverse control is shown in Figures 3, 4, and 8. Shaft 90 operates slider fork 91. Arm 92 swings in an arc about the center of 90. Poppet dimples x—y—z are cut in cam 93 fixed to shaft 90a and spring-loaded poppet 94 carried on the casing 202 may hold the cam 93 in one of the three forward, neutral, reverse positions. Rod 96 is ball jointed at 95 to arm 92 fixed to shaft 90 and is connected through linkage 364, 363, 362, 361, 359, 357 (of Figure 8) to hand control 350 in the driver's cab and serves to position the cam 93 manually. At the swinging end of the cam 93 is a roller link 97 connecting it to swinging lever 98 pivoted on the casing 100 at 99. The cam 93 may intersect the path of roller 102 pinned to the end of link 97. Figure 6 shows the parts related to slider 22.

The pedal 380 of Figures 8 and 11 controls "forced 2nd" shift and is arranged to move lever 98 as will be described.

Figure 3 shows slider 44 moved by a rocking shoe 122 swung on shaft 105 by supports 104, which carries externally the crank 106, having roller 107 and pivoted link 108 connected to lever 98, as in Figures 2 and 3.

When the hand selector 350 is moved to reverse position, roller 102 abuts the cam 93 at notch 93', link 97 moves lever 98, link 108, lever 106, and shaft 105 so that shoe 122 prevents the jaw clutch slider 44 from moving toward mesh with 45. Spring 109 loads lever 98 to the left in Figure 2, keeping 97 and roller 102 against cam 93.

When the hand selector 350 is in either "forward" or "neutral" positions, roller 102 is not shifted by the cam 93 and cannot interfere with the action of the weights 50, to load slider 44 for engagement.

A further action compels the carrier 5 to stand still when the "forced 2nd" pedal 380 is depressed, by means of the brake 120 on drum 65, which is set by rotation of the lever 109 and its shaft 121. This is to provide a quick downshift and engine braking in 2nd gear. The brake 120 is contracted on the drum 65 by cams 110 fixed to the brake cross shaft 121 as shown in Figure 3, but lag in the application of the brake permits the shoe 122 to push out the jaw slider 44 before the friction brake action of 120 begins. This is accomplished by cam 112 fixed to shaft 121 having dwell 113 and circumference sector 114, intersecting roller 107 of lever 106. It will be seen that whenever shaft 121 is rocked to apply brake 120, or whenever the shifter shaft 90 is moved to neutral or reverse, the shoe 122 prevents engagement of slider 44 and jaws 48 with jaw clutch 45 and jaws 49.

The centrifugal clutch 300 shown in Figures 13, 14 and 15 consists of a spider plate 303 fixed to rotate with the main engine shaft 301; intermediate elements 310 and driven drum 320 which latter is fixed to rotate with the outer member of roller clutch 2 and dog clutch 4. The spider plate 303 carries weight arm pivot shafts 304, shoe slide slots 308, toggle slide slots 309, weight abutments 307 and spring stops 313. Weights 305 are integral with arms 306 and carry pivoted links 312. Toggle link rod 314 pivots to toggle pin 316 which fits into slot 309. Rotatable equalizer collar 315 pivots to the linkages 312—314 at 318. Toggle pin 316 may move radially in slide 309, and carries pivot ends of adjustable toggle thrust rods 317—317a. The inner ends of thrust rod 317 carries pivoted compression head 321 and roller 322. Compression heads 323 are pivoted on the body of brake shoes 310 at 324. Heads 321—323 are slide-guide fitted. Rollers 322 bear against inner face of shoe body 310. Springs 325 transmit actuation force between heads 321—323.

The two shoes 310—311 are of welded box section as in Figure 15 and cut away in curvilinear outline toward each end as shown in Figure 13. Shoe slides 326 move radially in slots 308, and are pinned to the shoes 310 at 327. The shoe motion is restricted radially by the slide action and by the equalization linkage. Return springs 328 assist in breaking down the toggle motion upon deceleration, since at full actuation the self-wedging effect of the force at 308, 326 is appreciable. Springs 328 are wound about shaft 304 and hooked into plate 303 and weight arm 306 so that outward motion of weights 305 is thereby opposed, and inward motion augmented.

Springs 329 serve to release shoes 310—311 from drum contact, and distribute actuation force evenly in conjunction with the linkage.

Springs 328 are wound around their shafts 304 in single or multiple turns. The thrust linkage between equalizer collar 315 and the opposite end of the upper shoe, 310 at 317b, is a simple pinned connection, there being no need to duplicate the spring, roller and compression head construction. The lower shoe likewise has one compression coupling and one simple pinned connection. It has not been deemed necessary to duplicate the description of the duplicate parts in this construction, which is obviously parallel in structure and function.

The driver's compartment is equipped as shown in Figures 8, 9, and 11, handlever 350 being pivoted at 351 under the instrument panel as in Figure 8. Lever 350 may rock slightly on pivot 351 in the forward and reverse shift direction, to the top of slot 352 in plate 353 attached to instrument panel 354 mounted on the vehicle body. 350a is the handlever ball.

The mid-portion of slot 352 guides lever 350 transversely to the forward leg 355, and to the rearward leg 356, the mid-portion providing the neutral dwell. This shift apparatus is a variant of the straight line motion slot, and constitutes a simple mechanism for the driver's movements, the natural shift requiring no eye attention, so that the operator may focus his mind on the traffic conditions.

The knob 350a of the handlever 350 projects free and clear of plate 353, so that the hand can find it without sensory confusion. Since no main clutch maneuvers are required, the forward-neutral-reverse shifting is easily accomplished. The inner end of lever 350 is attached to rod 357 at pivot 358, and rod 357 is attached to eye 366 of bell-crank 359 pivoted to the frame at 360. Crank eye 361 is adjustably pivoted to longitudinal rod 362.

The other end of rod 362 is pivotally connected to bulkhead mounted bellcrank 363 shown in Figure 8. Shifter rod 96 extends from pivot 364 of bellcrank 363 to ball pivot 95 of shifter lever 92 pivoted on the clutch case 202 at 370.

In Figure 8 the shifter lever 350 is shown in the neutral driving position, in which the jaw clutch sleeve 22 of Figure 1 is not meshed with either of 31 or 25.

At the left of the driver's compartment, projecting through eyelet 371 in the floor, is the shank 372 of foot-button 380. This device is the operator's means for enforcing positive geared drive in second speed by clamping the brake 120 on drum 65 of Figure 1, described elsewhere in this specification.

In my first showing, the shank 372 of button 380 through rod 374 operates spring 373 of valve plate 375 controlling inlet valve 376 of Figure 11. Air reservoir 400 of Figure 9 kept at a given air pressure by a compressor and automatic valve system of common usage, has a pressure manifold 391 to which pipe 392 connects. Spring 373 exerts a lifting pressure to shank 372 to return button 380 to its upward position such that unless operator's foot compresses spring 373, the valve 376 seals port 379, preventing compressed air from pipe 392 from passing through the valve body 381 to the delivery port 382, which in this position is open to atmosphere through valve 377. When the button is held depressed, the spring 373 is tensioned, and valve 377 is moved to close off atmospheric port 393, and valve 376 admits air pressure from the pressure main 392 to delivery line 383.

As described in detail further, the air pressure from line 383 is exerted upon brake shoes 120 of Figure 1 to lock carrier 5 against rotation in either direction.

Valve 376 operated by foot pressure controls the operation of brake 120 by directing air from reservoir manifold 391 to cylinder 390, and valve 377 controls the latter connection to atmosphere for release. Depression of button 380 causes diaphragm 375' to deflect, actuating both intake valve 376 and exhaust valve 377.

When the brakes are released, inlet valve 376 is closed, and exhaust valve 377 open. Inlet valve 376 controls flow of air from line 392 to the cylinder 390. Exhaust valve 377 permits air in the cylinder 390 to escape to atmosphere through port 393 when the button 380 is allowed to rise.

Pressure of air delivered to the cylinder 390 is proportional to the distance the button 380 is depressed. As diaphragm 375' is deflected exhaust valve 377 closes and intake valve 376 opens, permitting air under pressure from line 392 to flow to the cylinder. As air pressure builds up in valve body 381, diaphragm 375' is lifted, compressing helical spring 373 until intake valve 376 closes. This is a condition of momentary equilibrium between spring tension and air pressure balance. Spring 378 seats valve 376, and spring 384 unseats valve 377.

Further depression of button 380 causes spring 373 to deflect to an additional degree, the equilibrium point being then established at a higher net actuating pressure.

When the pedal 380 is allowed to rise slowly toward released position, diaphragm 375' rises and exhaust valve 377 opens momentarily, releasing sufficient air to balance the control pressures at a lower net actuating value.

In this way, cylinder pressure is controlled to a fine degree between minimum and maximum by simple foot movement of pedal 380 yielding a complete graduation control of pressure, as operating conditions require. For installations which do not require fine gradation of brake pressure proportional to pedal position, the electrical arrangement of Figure 9 is provided. A simple spring opened switch 380' connects battery 331 to solenoid circuit 332 through movable and fixed contacts 333—334. Solenoid winding 335 energises solenoid valve member 336 ordinarily held closed by spring 337, so that port 382' is open to atmosphere, and port 379' closed to the line air pressure from 392. When the switch button 380' is depressed, electrical energy moves valve 336 against the action of spring 337, closing port 377' and opening port 376', admitting line pressure to 383, hence operating diaphragm 389 and setting brake 120. To obtain gradations of pressure in cylinder 390, and avoid abrupt brake application, the operator makes successive, short movements of button 380' against spring 337, whereupon the pressure lag in line 383 and cylinder 390 may be utilized.

The preceding described mechanism enables the vehicle operator to compel positive geared drive at any time, whether it is necessary to accelerate, by shifting down to second speed from direct, or the gradient conditions require positive drive in place of the freewheeling drive obtained in low gear. The operator may continue to drive in a positive gear speed such as second speed, while completely inhibiting any automatic shift from the positive drive to any other speed. In mountainous country, where long gradients are met, and safety rules require that freewheeling action be set aside, while engine braking is utilized, this feature proves to be of maximum utility.

It should be noted that inadvertent depression of the button when driving in low gear will not interfere with the automatic shift to 2nd speed, but once in 2nd speed, it will be impossible to shift to top gear or direct drive until the button is relieved from foot pressure. The operator may use this button continuously in traffic for conditions in which the frequency of short stops and the heavy loads prevent reaching direct drive for a considerable time and distance interval.

An important utility in the button 380 is in the smooth shifting from neutral to either forward or reverse. Whenever the handshift lever 350 is moved to accomplish these shifts, the momentary depression of the button applies brake 120 to carrier 5, absorbing the residual inertia of the rotating elements, and bringing the jaw teeth 25 or 31 to zero speed, whence slider 22 may mesh with either without clashing.

As a time saver for strict maintenance of schedules and as a safety feature this arrangement is believed novel, in combination with other features to be described following.

Air cylinder 390 is shown in Figure 12 mounted on the casing 100, and linked to brake rocker 109 and shaft 121 which not only applies the brake, but also through the linkage of Figures 2 and 3, may rock shaft 105, and inhibit slider 44 from engagement with jaw clutch 45, as described preceding. Conduit 383, joined to outlet port 382 of the control valve of Figures 10 or 11, delivers compressed air to the diaphragm 389 joined to rod 388 pivoted to 109.

The operator, after having started the vehicle engine, moves lever 350 from the neutral position of Figure 8 to the forward driving position shown by letter F, momentarily depressing button 380. Through the described means, sleeve 22 is moved to mesh with jaw teeth 31 of Figure 1.

Opening of the engine throttle causes clutch shoes 310—311 to be thrust toward clutch drum 320 through the described toggle linkage of Figure 13, and power is applied to drum 320, race ring 70 and camplate 16 to shaft 1 and sun gear 13 of the transmission. Sun gear 10 connected to the loadshaft 11, acts as a momentary fulcrum for the rotatable carrier 5 and planets 6—7—8, whereupon carrier 5 is given a retrograde force component. Within a few degrees of rotation, roller clutch 26 locks sleeve 19 of carrier 5 to ring 30 held by jaws 22 against rotation, and the power being delivered from the engine through shoes 310—311 and drum 320 is exerted upon sun gear 13, and rotates the loadshaft 11.

Momentary relaxing of the drive causes roller clutch 2 to release, as will be apparent when the shaft 1 will tend to run faster than the engine shaft 301.

Above a given speed of shaft 1, hollow shaft 3 fixed to sun gear 12 will spin governor weights 33 fast enough to load spring 39 of jaw clutch 35 so that the latter will slide along splines 36 toward contact with jaw clutch teeth 4 rotating with the engine.

While the engine speeds remain faster than the idling speed of hollow shaft 3, the contacting inclined faces 40—41 of the jaw teeth 4—35 reject mesh, but as soon as the engine speed falls below that of shaft 3, the governor force through spring 39 upon sliding jaws 35 will mesh and seat the teeth into positive engagement, at synchronism of the jaw pairs, since at zero speed difference, the rejection force of the jaw clutch inclination disappears, and spring 39 becomes effective.

At this instant the existing engine rotation is applied to the sun gear 12, and second speed drive begins. Solid shaft 1 and sun gear 13 now idle, and by virtue of the lever arm lengths of planets 6—7—8 and sun gears 13—12, the shaft 1 now rotates faster than the engine, the roller clutch 2 idling also.

Now during the transition from low gear to 2nd speed, the relaxing of the engine throttle momentarily relieves the reaction sustained load on roller clutch 26 of carrier 5, and the carrier 5 may actually rotate forwardly from its condition of rest by virtue of the one-way action of roller clutch 26. However, as soon as the drive of the engine is established through jaw clutches 4 and 35 and sun gear 12, the roller clutch 26 renews its reaction sustaining function, and anew prevents retrograde rotation of carrier 5.

At this point the operator may depress button or pedal 380 of Figure 8, and hold the drive in second speed through sun gear 12 planets 6—7—8 and sun gear 10 as long as is desired, the planet shafts 9 constituting multiple lay shafts for the drive.

With button or pedal 380 not depressed, and fluid pressure motor 390 inactive, the operator may at the desired interval, again relax the accelerator pedal, relieving the torque reaction on roller clutch 26, while the inertia of motion of the vehicle becomes active to rotate the carrier 5 forwardly, or in the direction of rotation of the engine.

When the carrier speed reaches a predetermined point, governor weights 50 mounted on the carrier 5 stress springs 58—56 through flange 46, loading carrier jaw clutch teeth 48 of slider 44 for engagement with jaws 49 of clutch 45 rotating with the load shaft 11.

In the description of the operation of the mechanism it is assumed that the centrifugal engine clutch 300 is active to drive unless specifically stated otherwise.

The centrifugal clutch 300 at the left of Figure 1 transmits drive through roller clutch 2 to shaft 1 and sun gear 13. The load torque of the vehicle is applied to sun gear 10 through shaft 11.

The reaction of applied power on sun gear 13 and load on sun gear 10 is exerted through the intermeshed planet cluster 6—7—8 to carrier 5 which endeavors to revolve backward. Roller clutch 26 thereupon locks and the planet shafts 9 cannot therefore rotate about the main shaft centerline. The roller clutch 26 acts as a self-locking reactor or fulcrum, and drive from engine connected shaft 1 to load shaft 11 proceeds, the planet shafts 9 acting as counter or lay shafts.

If the car operator relaxes the throttle, decelerating the engine, both roller clutches 2 and 26 will release, and the vehicle will coast.

While the above type of operation may be going on, the idle second-speed sun gear 12 is rotating because of its meshing with the planet cluster 6—7—8 and the attached jaw clutch 35 and weights 33 are rotating as well. When this rotation increases, to a predetermined point, the weights 33 fly out, overcoming springs 39.

The jaw clutch 35 thereupon slides to the left and the inclined faces 41 of its teeth bear against the inclined faces 40 of the mating jaw clutch 4 attached to the driven member 320 of the centrifugal clutch 300.

Because of the fact that the rotational speed of jaw clutch 4 is by gear design faster than that of jaw clutch 35, the inclined faces of both clutches reject mesh, and these jaw clutches cannot pick up drive until the engine speed be reduced to synchronism by relaxing the accelerator pedal.

When this is done, the engine connected jaw clutch 4 comes to a lower speed until it approaches synchronism with clutch 35, whereupon the rejection forces vanish, and springs 39 are effective to complete mesh of the clutches 4 and 35, which now can transmit torque bi-directionally on the flat sides of the meshed teeth. The inclination direction of the inclined faces of the 2nd speed jaw clutches is shown in Fig. 21, for an installation in which the normal hand of rotation of the engine is clockwise when viewed from the left of Figure 1.

During the changeover interval, the roller clutch 2 in the low gear torque path has run free so that a differential of speed between the driven part 320 of the centrifugal clutch 300 and the second speed shaft 3 is made possible.

With the resumption of engine speed for drive in the 2nd speed ratio, once again, the carrier 5 receives a retrograde force, and roller clutch 26 locks the carrier 5 to the web 101. Drive passes through jaw clutches 4 and 35, hollow-shaft 3 sun gear 12, planet pinions 6 and 8, and sun gear 10 to the load shaft 11.

If the car driver relaxes the throttle while driving in 2nd speed, the reaction roller clutch 26 releases as soon as the load shaft 11 becomes the driver, or as soon as overrunning torque exists, and the vehicle freewheels. Should the car driver not again accelerate, the deceleration of weights 33 will permit springs 80 to de-clutch 35 from 4, setting up the conditions for renewal of drive in low gear. At a given engine speed, the centrifugal clutch 300 will cease to drive, but the car operator may renew drive in low gear by then opening the engine throttle.

Drive in either low gear or second speed may be continued at the will of the operator, by his sustaining of driving torque through depression of the accelerator pedal, although on a down grade the vehicle may freewheel in either speed.

Now, when the operator desires to go into direct drive, the accelerator pedal is relaxed. Once more the reaction roller clutch 26 releases the carrier 5 for forward rotation. The existing forces for causing the carrier to advance in rotation from zero speed are applied through both sun gears 10 and 12, from both the power and the load.

Jaw slider 44 with its teeth 48 is splined on the extension of web 62 of the carrier and mates with clutch 45 through teeth 49 fixed to the load-shaft 11, to form the direct drive coupling. The movable slider 44 is held disengaged by springs 58 and is loaded for engagement by weights 50, which obtain their force from rotation of the carrier 5. The construction detail is shown in Figure 22.

The beveled faces 48 and 49 meet as the speed of the carrier increases, but mesh is rejected until the speed of the carrier 5 comes up to the speed of the load shaft 11. When synchronism is reached, the rejection forces disappear, and the weight force overcomes springs 58, the jaws 48 and 49 meshing and transmitting two-way drive.

As long as the vehicle continues to be driven at a speed of the load shaft 11 sufficient to keep the jaws 48 and 49 in mesh, bi-directional torque may be transmitted between the engine and the load shaft 11, whether or not overrunning torque may be permitted to exist by relaxing of the engine throttle.

As a matter of fact, the speed may fall below the critical point, for release of the jaws 48 and 49 and direct drive may be still maintained by the operator sustaining engine torque through throttle pedal depression. However, with relaxed throttle and a decrease of load shaft speed to the point where springs 58 may overcome the effect of the weights 50, the direct drive teeth 48-49 will be demeshed.

Now, it will be understood that when the direct drive clutch has been engaged, the couple established between the carrier 5 and the load shaft 11 causes the sun gears 12, 13 and 10, shafts 1 and 11 and the carrier 5 to rotate together at unit speed.

The 2nd speed jaw clutch 4—35 during the direct drive interval has remained engaged. The release of the direct drive slider 44 pre-sets the conditions for resumption of drive in 2nd as long as the speed of the 2nd speed shaft 3 is sufficient to sustain engagement of the 2nd speed clutch 35 with jaw clutch 4.

The depression of the throttle pedal, with the direct drive jaws 48—49 out of engagement sets up a retrograde force on the carrier 5 unless the vehicle be operating on a down gradient. The instant that the carrier 5 slows down to zero speed, the reaction sustaining roller clutch 26 locks, the carrier 5 stops, and torque may flow from the engine.

The description of operation at this point covers the simple responses of the operating mechanism to ordinary manual and automatic control. The mechanism as thus far described may be considered useful without modification of function or principle, in the passenger car or commercial vehicle. It has been found, however, in practise, that certain added elements are necessary, to insure a higher degree of control of the operator over the mechanism at all times.

As described preceding, brake member 120 is mounted on the casing and actuated by brake operating shaft 121 for halting or releasing the carrier 5. Auxiliary pedal 380 conveniently situated to the foot of the driver is connected through described means to shaft 121 and also to throw-out shoe 122 of jaw clutch 44. This system is called for convenience, the "forced 2nd shift" control. It is required to provide a safety descent in mountainous country, wherein the engine may be used as a brake, with the transmission in 2nd speed ratio, and for easy shift inertia absorption.

The pedal 380 may be depressed, and the "forced 2nd" shift made whether or not the engine throttle is relaxed or advanced, since the brake 120 is a bi-directional locking means for the carrier 5, instead of unidirectional, such as the reaction roller clutch 26.

The connection between the pedal 380, shoe 122, and the brake operating shaft 121 is arranged for the cam 122 to become active before the brake 120 is applied. A smoother shift between direct and 2nd on a downgrade is made if the "forced 2nd" pedal 380 is used while the engine throttle pedal is also being depressed, in that the transition period is shorter, and the brake 120 does not then need to take up so much inertia forces, which provides less of a shock to passengers.

If proceeding in low gear, the operator may also use the "forced 2nd pedal", but freewheeling will occur because of the power being transmitted through low speed roller clutch 2, and the shift over to 2nd may be delayed because of the inability of the carrier 5 by forward rotation to assist in the speeding up of the freely rotating 2nd speed shaft.

If driving in 2nd speed, the operator may depress the "forced 2nd shift" pedal 380, and by locking the carrier 5 against rotation in either direction through brake 120, continue drive in 2nd speed ratio regardless of gradient or equivalent variable driving condition.

For momentary downshift to 2nd from direct, the driver may simply depress pedal 380 and remove his foot, but as soon as the relaxing of the throttle occurs in the speed zone where weights 50 are active, the mechanism will again go on into direct drive.

On starting up from zero car speed, if the operator's foot happens to be on the pedal 380, no harm will be done, since the only effect will be that carrier 5 is immobilized, and drive in low gear will result.

When the shift selector 350, for forward, neutral or reverse is moved to reverse position, 2nd speed shaft 3 now becomes a fixed reaction member. If brake 120 were to be applied a stalling couple between sun gears 12 and 13 and carrier 5 would ensue, risking damage to the mechanism. To prevent such wrong motion, the reverse shift mechanism shown in Figure 2 and described preceding, renders the normal action of governor weights 50 ineffective.

Hollow shaft 3 has fixed to it toothed element 12, which normally idles during low speed forward drive. Manually operable slider 22 is mounted on an extension 101 of the fixed casing 100. When in forward drive, the slider 22 is toward the right, causing the outer member 27 of roller clutch 26 to be non-rotating, thereby setting up torque reaction means for the carrier 5. In this position slider teeth 22 engage teeth 31.

Before shifting handlever 350 to "reverse" the operator may absorb the rotating inertia of the transmission elements by depressing button 380, which operates brake 120.

When the slider is moved left, as in Figure 1, its teeth 22 engage the teeth 25 of element 23, causing the hollow shaft 3 and sun gear 12 to remain stationary, which shaft and gear now become reaction means for the reverse drive. In reverse drive, the engine shaft 301 and centrifugal clutch 300 deliver power to low gear shaft 1 through roller clutch 2.

Since sun gear 12 cannot now rotate, the application of power to pinion 7 of the planet cluster 6—7—8 causes the carrier 5 to rotate slowly in the reverse direction to the low gear shaft and engine, while at the same time the planet clusters revolve in the reverse direction because of the reaction effect of the now fixed sun gear 12. Loadshaft sun gear 10 being meshed with pinions 8 of the planet cluster 6—7—8 therefore revolves backward. This is true planetation movement.

Freewheeling may occur in reverse gear, because of roller clutch 2. If the brake 120 on the carrier 5 is accidentally engaged, it can only brake the reverse motion of the vehicle.

When in direct drive, the couple established by jaw clutches 44 and 45 compels shafts 1, 11, 3, gears 10, 12, 13, and carrier 5 to revolve at unitary speed. A sudden requirement for 2nd speed geared drive in similar mechanisms is met by simply releasing jaw clutch 44 from 45. During the no-drive interval which follows, the vehicle inertia forces are revolving shaft 11 and sun gear 10, applying a component of rotation to carrier 5, which may be positive, because of the friction effects of the various bearings and associated parts.

At the same time, the engine may be increasing in acceleration, rotating shaft 3 through jaws 4—35, and also applying a component to carrier 5 of negative characteristics, the two components, theoretically, canceling until the synchronous zero speed point of carrier 5 is reached. Theoretically then, the roller clutch 26 simply locks at zero reaction torque or at an extremely low reaction torque value.

Practically, the above conditions are overridden by the dissimilarities of the net yields in each of the engine and vehicle systems imparting force to the carrier. Further, the rate of change of inertia values in the engine-connected system is of a different magnitude and range from that of the vehicle drive-connected system. The parts of the roller clutch 26 also add elasticity to the force compensating action of the elements involved. The resultant overlap of torque reaction causes a measurable shock load to be imparted to the roller clutch 26, which is accentuated by the fact that rollers 28 must move through a definite number of degrees of angularity before locking to ring 27. The play in teeth 22—31 also augments the shock load effect.

In practice, under certain circumstances, such shock loads may become severe enough to crush the rollers 28 into the faces of cam plate 27, score the race 30, or actually burst the external ring 27—31. Therefore the brake control system of Figures 9, 10, 11 and 12 provides means to ameliorate shock on the roller clutch 26 by bringing carrier 5 and associated elements to a stop whenever forward or reverse shift is attempted.

My utilization of this form of speed ratio shift control is believed novel, in that shock loads such as encountered in large, massive power transmission drives for rail cars and busses, are of such magnitude that the specialized means to prevent inertia energy originating in change of speed ratio from damaging parts of the transmission mechanism, seem to be required.

The rear extension of output shaft 11 protrudes through an opening in casing 100 where bearing 130 supports it, to sub-casing 203 where it is further supported in bearing 131. Pinion 132 is keyed to shaft 11 to revolve therewith and constitutes the driven output member of the transmission assembly. The gear drive beyond this point is shown in Figure 23.

Meshing with pinion 132 is pinion 133 carried on jackshaft 206 supported on bearings 134 and 135 in jackshaft housing 136. Shaft 206 terminates in flanged spline collar 137. The angular displacement of shafts 11 and 206 is the so-called "angle drive," subject matter of Austin U. S. S. N. 624,462, filed July 25, 1932, now matured as U. S. 1,993,912, issued March 12, 1935. In the present showing, the ratio between shafts 11 and 206 by pinion gears 132 and 133 is a reduction drive, and provides an auxiliary means to reduce the shaft speeds prior to the customary pinion, ring gear and differential mechanism.

Flanged collar 138 and closure plate 139 cooperate with gland 140 to prevent leakage of oil from jackshaft housing 136. Spacer sleeve 141 is fitted between bearings 134 and 135, to establish bearing positions properly along shaft 206 in housing 136.

The main transmission casing 100 is bolted to the main clutch casing 202 at 142, and to frame supports shown in Figures 2 and 5. Casing 203 for the pinions 132—133 is bolted to casing 100 at 143. Jackshaft housing 136 is bolted to casing 203 at 144 and to casing 100 at 145. This composite form of construction is devised to afford easy access for adjustment and repair, and in conjunction with other features, constitutes an important improvement.

The extension or end wall 401 of casing 203 is cast and machined for the mounting plate 402 of oil pump gears 405 and 406, and for fitting of the oil pump plate 407, attached by bolts. The rotor gear 405 is hexagonally splined to driver tube 410 which extends toward the engine in drilled passage 411 in shaft 11. The remote hexagonal end of driver tube 410 sockets in the pilot stub 415 of shaft 1 and rotates with shaft 1. Cup 417 recessed in the enlarged end of passage 411 in shaft 11 serves to seal the pilot opening, and is held by spring 418 so as to float longitudinally with movement of the shafts 1 and 11.

The stator gear 406 of the pump rotates on bushed pin 412 supported in plate 407, and meshes with gear 405. The pump pressure is developed in space 413 with rotation of shaft 1, tube 410 and gear 405, and the tube 410 connects therewith to deliver oil to main drilled passage 414 in shaft 1.

Figure 7:
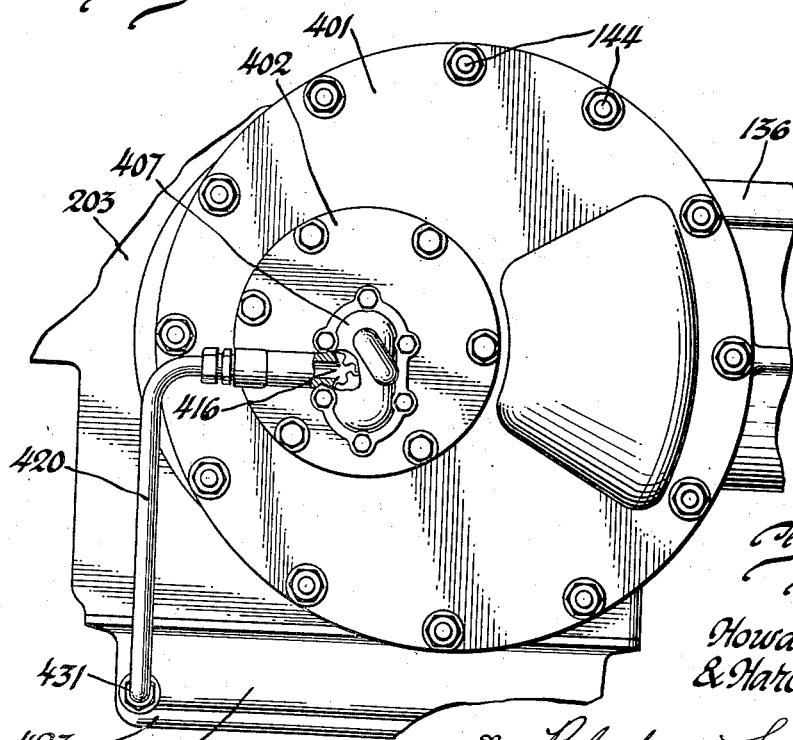
Figure 7 is a view taken in a plane at right angles to that of Figure 1, from the extreme right of Figure 1, showing the connections of the oil pump and the housing mountings.

The suction space 416 of the pump as shown in Figure 7 receives oil from tube 420 connected to sub-chamber 421 of the main transmission casing 100.

Sump plate 422 finned at 423 for heat dissipation is bolted to casing 100 at 424, receiving oil through port opening 425 from casing 100. Filter screen 426 is bolted to the plate 422 at 430 and nipple 431 of tube 420 draws oil from the sub-chamber 421 formed by the plate 422 by suction of the pump described preceding. Figure 7 shows the external parts of the auxiliary gear casing 203.

The separation flanges 433 of casing 100 serve to isolate the sump oil from the small quantity actively in use by splash and dip inside the main transmission casing 100, so that no froth of oil and air can get into the pump suction line 420 to cause intermittent pressure in the pump pressure space 413 and tube 410. Because of this, the static head of oil in sump 421 is sufficient to assure clean-cut priming of the pump on starting, and our arrangement removes the difficulty experienced with preceding arrangements, wherein froth produced by churning of gear elements causes uneven and consequently unsatisfactory operation.

A small amount of leakage of oil under pressure may leak through the fitting of the hexagonal end of tube 410 in the pilot end 415 of shaft 1, and thereby lubricate pilot bearing 55 between shafts 1 and 11, flowing past the wall of the sealing cup 417.

The pressure line 414, drilled in shaft 1 has 4 side-cut passages, the first 150 feeding oil to bushing 18 between shafts 1 and 3, where customary annuli are cut for circumferential distribution. A continuation 150a of 150 is cut in shafts 3, and bearing 20 which supports it in the extension 19 of carrier 5 likewise drilled radially. Race member 30 of roller clutch 26 is drilled radially with multiple passages 151 to each of the roller pockets 86, whence flanges 89 and 89a serve to restrict the outward flow of oil from the pockets 86.

As in our S. N. 32,526 filed July 22, 1935, the roller pockets are maintained under pump pressure, augmented by the restriction in the outward flow therefrom, creating a high velocity lateral stream from the cam contour sides of the cam plate 27.

The teeth of the sun and planet pairs 12—6, 13—7, and 8—10 are lubricated by longitudinal flow along bushings 18 and bearings 20, and drilled passage 152 in web 63 of carrier 5 carries off excess oil.

Oil escaping from overrunning reactor clutch 26 flows along the thrust washers shown to lubricate the teeth 31 and slider 22, and bearing 21 in part.

The second side-cut passage 153, in order from the source, likewise feeds bushing 18, and through passage 153a drilled radially in the stub end of hollow shaft 3, lubricates the thrust washers between the mounting of 2nd speed drum 23 and bearing 21, also lubricated by this flow.

The third side cut passage 154 feeds annulus 155 of low speed roller clutch cam plate 16, and flows through radial passages 156 to each of roller pockets 73, where the flanges 79 and 81 restrict the outward flow as in the construction of roller clutch 26. The fourth side-cut passage 157 lubricates bearing 15, as shown.

The main clutch housing 202 has, as shown in Figure 13, a bolted scoop member 215 arranged to receive the oil thrown by the main clutch drum 320 in the normal direction of rotation of the engine. This prevents undesirable accumulation of oil within the main clutch housing, and provides means to recirculate the transmission oil for maximum cooling effect. Without this construction, the lower portion of the clutch housing would act as a catch basin, and the needless churning of the oil would generate undesirable heat.

Scoop 215 is equipped with outlet nipple 216 joined to delivery pipe 217, which in Figure 23 connects to nipple 218, feeding the jackshaft housing 136.

Bearings 134 and 135 are lubricated from this source, and the drain back from 136 into compartment 203 maintains the latter at such a level that overflow back into the main transmission casing 100 may pass through bearing 130.

It is believed novel to lubricate in the above manner, from a main clutch housing, so as to establish a flow circuit through remotely placed shaft bearings and gearing. The combination of a complete circuit pressure lubrication system for roller clutches, and the maintenance of the roller pockets under all driving conditions, at a net high pressure from the pressure source, yields operating advantages of commercial utility, in that the cushioning effect of the oil in the roller pockets reduces shock; the velocity effect at the outlet restriction passages prevents the metallic chips and dirt from remaining in the pockets, and the overall cooling capacity of the combination system as a whole tends to increase the life of the roller clutches.

Other novel features appear herewith in our application, as noted preceding, and have been described in considerable detail, and as applied to a motor vehicle of specialized utility, but it is to be understood that the invention is capable of various adaptations and that the structure may vary over a considerable range of mechanical arrangements without departing from the spirit of the invention as defined in the following claims.

We claim:

1. In automatically operated gearing, in combination, a driving shaft, a driven shaft, a low speed one-way clutch, a main centrifugal shoe clutch arranged to establish initial drive from said driving shaft through said low speed one-way clutch, a centrifugally operable second speed jaw clutch arranged to transmit two-way positive drive from said main clutch while rendering said low speed one-way clutch inoperative, a centrifugally operable direct drive jaw coupling clutch arranged to transmit positive two-way drive from said main clutch to said driven shaft to provide engine braking while leaving said second speed clutch in engagement, and unitary manual control means operative to set aside the action of said direct drive jaw clutch and compel positive two way drive between said shafts in second speed through said second speed jaw clutch.

2. An automatically operable variable speed planetary transmission unit having a reaction drum including brake operating mechanism therefor and a direct driving clutch affording positive two-way coupling between transmission input and output shafts, a brake operating cylinder associated with said mechanism, a source of fluid pressure connected to said cylinder, a valve operative to admit fluid pressure to said brake operating cylinder from said source, connections between said mechanism and said clutch whereby the clutch is released prior to braking action of said brake, geared driving means adapted to transmit power between said shafts when said clutch is released, and electrically actuated valve control means whereby the driver may selectively compel continuous positive two-way drive through said clutch or said geared driving means at will, while setting aside the automatic operation of said unit.

3. An automatically operable variable speed planetary transmission unit having a reaction drum including an auxiliary brake operating mechanism therefor and a direct driving clutch affording positive two-way coupling between transmission input and output shafts, a brake operating cylinder associated with said mechanism, a source of fluid pressure connected to said cylinder, a valve operative to admit fluid pressure to said brake operating cylinder from said source, mechanical connections between said mechanism and said clutch whereby the clutch is released prior to braking action of said brake, and a valve control means whereby the driver may selectively compel continuous drive in reduction gear speed at will or elect drive affording engine braking in direct through said direct driving clutch.

4. An automatically operable variable speed gearing embodying low, intermediate, direct and reverse speed torque paths, a centrifugally operable main clutch effective to transmit drive from said engine to said output shaft through any of said paths, a primary low speed shaft driven from said clutch by an overrunning mechanism, an intermediate speed shaft connectable to said clutch through an overrunning and positive driving mechanism, a rotatable member operative to sustain reaction torque for drive transmitted by either of said shafts, an output shaft, clutching means arranged to couple said member directly for two-way positive drive with the output shaft, braking means for said member effective upon retrograde rotation of the member, additional braking mechanism for said member effective upon rotation in either direction of said member, and a unitary control for said mechanism and said clutching means operative to disengage the latter prior to braking action of said mechanism.

5. In controls for variable speed gearing, in combination, an input element, an output element, a member freely rotatable with respect to said elements, gearing arranged with said input element and said member to rotate the output element at a different speed when the member is locked against rotation, reverse driving gearing between said elements, control mechanism for said gearing, a shiftable automatic clutch operable centrifugally to couple said member to the output element for positive unitary rotation, therewith to yield engine braking when the clutch is coupled, braking means for said member, an operable connection between the braking means and the clutch for shifting the clutch to inoperative position when the braking means is operative, and connecting means between said mechanism and said clutch for maintaining said clutch in inoperative position when said control is set for establishing reverse drive.

6. In self-actuating variable speed gear devices, in combination, a drive shaft, a driven shaft, a step gear transmission unit connecting said shafts embodying elements operable by the drive shaft to turn said driven shaft in one direction at different forward speed ratios, including at least one pair of mating jaw clutch elements yielding positive two-way drive between said shafts, said elements being operable to turn said driven shaft in the opposite direction at one reverse speed ratio, directionally engaging clutches arranged to shift the connection of said elements when the speed of the drive shaft is momentarily reduced below the speed of one of said elements when in forward drive, speed responsive means separately operative to actuate said clutches for engagement, one of which means is adapted to control the drive of the said pair of mating jaw clutch elements, and movable control means connected to lock one of said elements against rotation for forward drive at one speed ratio, likewise effective when said elements are driving in reverse, while preventing actuation of one of said clutches by said speed responsive means under either of said forward or reverse drives.

7. In power transmissions, in combination, a driving shaft, a driven shaft, an epicyclic gearing connecting pinions rotating with said shafts, a carrier for said gearing, a one-way torque reaction sustaining device for said carrier, two-way friction braking mechanism for said carrier, automatic means for compelling positive two-way rotation of said carrier with both said shafts while relieving said device of torque reaction, locking means effective to inhibit said automatic means from acting, and operating means for said mechanism not only effective to actuate said locking means prior to braking of said mechanism upon said carrier, but also effective to reestablish operation of said automatic means for two-way drive when said braking mechanism is relieved.

8. In vehicle transmissions of variable speed ratio characteristics, the combination of a drive shaft, driven shaft, variable speed ratio gearing between said shafts, transmission control means for said gearing, clutch mechanism controlled thereby operable to establish different ratios including low, reverse and intermediate through said gearing embodying a speed responsive direct coupling clutch providing positive engine braking between said shafts, centrifugal means to operate said clutch, means to disengage said clutch, and means for preventing operation of said centrifugal means when the transmission control means is set for reverse and intermediate speeds.

9. In power transmission controls, in combination, an engine, a planetary gear driven by said engine including a planet carrier, an air supply pump driven by said engine, a reservoir connected to said pump, a brake actuating mechanism, brake members actuated by said mechanism to lock said carrier against rotation, a cylinder and pneumatic piston arranged to load the brake members against the action of said springs, a direct drive coupling clutch effective to compel positive, two-way rotation of said carrier with the output shaft, means to compel disengagement of said clutch connected to said mechanism arranged to act prior to any braking action of said members upon said carrier, including an air line connecting said reservoir and cylinder, and a valve operative to admit and release air under pressure to and from said cylinder.

10. In power transmissions, in combination, a variable speed gearing unit including ratio changing shifter mechanism embodying, a control shaft arranged to move a shifter to any one of three positions for establishing forward, neutral, or reverse drive in succession, an automatically engageable and disengageable clutch in said unit, a cam mounted on said shaft, a frame mounted poppet bearing on said cam arranged to limit and sustain the positioning of said shaft for said three positions, and a member held by said cam when forward or reverse drive is established whereby said clutch is rendered inoperative.

11. In gearing controls, in combination, driving and driven elements, a rotary member, gearing carried by said member, a planetary gear which operatively connects the driving element and said gearing for at least two separate forward geared speed ratios and a clutch which positively connects the driven element and said member for solid two-way drive therebetween, governor means effective to alternate drive through either of said planetary gear or said positive clutch, and manual means operative to set aside the action of said clutch while compelling drive through said gear for either of the said two separate forward speed ratios.

12. In controls for power drive devices, in combination, variable speed planetary gearing, including a one-way rotatable member effective to sustain torque during forward geared drive of said gearing, clutch means to transmit torque when said member is non-driving including a positive two-way clutch coupling input and output shafts of said gearing, shiftable means to establish additional geared drive by locking a second rotatable element of said gearing against rotation, a common control for said member and said shiftable means effective to render said member inoperable while locking said element against rotation, and mechanism moved by said control operative to inhibit engagement of said clutch means when said member is inoperable and said element is locked against rotation.

13. In variable speed gearing in combination, a drive shaft, a driven shaft, variable speed mechanism for connecting said shafts, including a drum, a band encircling the drum, a positive jaw clutch for fixedly joining the drum to one of the shafts for solid two-way drive therebetween, clutch operating means therefor, a lever for applying the band to the drum, means for moving a portion of said lever to a given position when applying the band, and means whereby the initial brake applying movement of said lever first moves said clutch operating means.

14. In power control devices, in combination, input and output shafts, variable speed gearing therebetween embodying geared elements, a selector for certain ratios of said gearing, ratio shift actuation means for said gearing, a coupling clutch effective to prevent relative rotation of certain of said elements for positive two-way rotation therebetween, disabling means moved by said selector when in one position operative to render said positive clutch inactive, and auxiliary selective control means for at least one ratio of said gearing, simultaneously operative upon said gearing while rendering said positive clutch ineffective through said disabling means.

15. In variable speed gearing, the combination of a plurality of gearing elements including a rotatable reaction-supporting member, uni-directional reaction locking means for said member, bi-directional locking means therefor, a coupling clutch positively effective to prevent relative rotation of all of said elements when engaged whereby two-way positive drive is obtained, a master controller movable in one direction effective to establish uni-directional reaction locking of said member and movable in another direction operative to establish locking of one of said elements while rendering said positive clutch inactive, and an auxiliary manual control arranged to establish locking of said bi-directional means while rendering said positive clutch inactive.

16. In variable speed control devices embodying rotatable reaction members, means effective to lock one of said members against rotation, a fluid operated actuator for said reaction locking means, a valve controlling said actuator, an electrically moved mechanism controlling said valve, and an operator-operated relay connected to said mechanism effective to compel instant movement of said valve and thereby immediate operation of said actuator and consequent locking action of said means, at will.

17. In driver-controlled vehicles, in combination, driving gear embodying selective, variable speed gearing, input and output shafts, a rotatable reaction-sustaining member, braking means to arrest the rotation of the member, one of which means is an automatically operable device, clutching means to enforce positive two-way rotation of the member with one of said shafts whereby a solid couple between said shafts is obtained, a pneumatically operated mechanism arranged to actuate said braking and one of said clutching means, and a manually operable relay effective to compel actuation of said mechanism at the will of the driver.

18. In variable speed gearing control and actuation mechanisms embodying selective step gearing and a coupling clutch adapted to establish solid two-way drive between input and output shafts, a primary gearing selector, an auxiliary selector, a disabling means for said clutch moved by said primary selector when placed in one position, and means moved by said auxiliary selector likewise effective upon said disabling means at the will of the operator.

19. In variable speed gearing, in combination, input and output shafts, interposed variable speed gearing, a reaction sustaining member including a brake drum, a contractile brake operative to lock said drum against rotation, a one-way locking device arranged to prevent retrograde rotation of said drum, a coupling clutch one element of which is rotatable with said drum, the other element of which rotates constantly and fixedly with one of the shafts, disconnecting means for said clutch, speed ratio controls for said gearing, and mechanism arranged to actuate said means for all driving conditions wherein said device or said brake are made active by said controls.

20. In power controlling mechanisms, in combination, a manual selector movable to a plurality of speed-selecting positions, an auxiliary selector movable to predetermined positions, variable speed gearing embodying geared elements, and torque-carrying members, a normally disengaged coupling clutch arranged to provide positive two-way unitary rotation of said geared elements with said members when engaged, a member clutchable by said coupling clutch, stressable biasing means capable of establishing forces tending to engage said clutch, speed operated means rotating with said clutch effective upon said biasing means at a predetermined speed to establish engaging forces upon said clutch, disabling means operative to set aside the effect of said speed operated and said biasing means when said selector is moved to one of said positions, and operative when the selector is moved to another of said positions to restore the action of said speed operated and said biasing means, and means moved by said auxiliary selector effective upon said disabling means when said auxiliary selector is placed in a predetermined position.

21. In gearshift mechanism for motor vehicles, in combination, a selector lever for forward neutral and reverse drive movable in one direction between limiting forward and reverse positions, a dash mounted plate slotted to permit such movement of said lever, said slot extending continuously in the same direction between the said limiting forward and reverse positions and having parallel end sections without interruption except for a non-parallel neutral mid-section, transmission means operable to establish forward, neutral and reverse drive, mechanical actuating linkage connecting said means with said lever, whereby selecting movement of said lever is effective to actuate said means, and an affirming poppet coacting with said means, arranged to sustain said means in any one of the positions selected by said lever.

22. In gearshifting controls for motor vehicles in combination, a forward, neutral and reverse selector lever movable freely between limiting forward and reverse positions, a slotted guide plate for said lever the slot of which is continuous slotted between parallel end sections and having a non-parallel neutral mid-section, transmission means operable to establish forward, neutral and reverse drive, additional transmission mechanism operable automatically to establish positively coupled direct drive between input and output shafts, mechanical actuating linkage connecting said means with said lever whereby selecting movement of said lever is effective to actuate said means, an affirming poppet coacting with said means arranged to sustain said means in any one of the positions selected by said lever, and an interconnection between said means and said mechanism adapted to prevent automatic establishing of direct drive whenever said lever is moved to reverse or neutral positions.

23. In motor vehicles, a power shaft and a load shaft, gearing arranged to provide forward, neutral and reverse drive between said shafts, shifter means for said gearing, a hand lever adapted to place said gearing in forward, neutral and reverse drive positions, a slotted plate, a continuous smooth slot for said lever cut in said plate having an upper leg, a parallel lower leg and a cross shift connecting portion joining the legs, connecting means between said lever and said shifter means operative to establish reverse drive in said gearing when the lever is moved to occupy the lower leg of said slot, to establish forward drive when the lever is moved to the upper leg of said slot, and to set up neutral when moved to the leg connecting portion of the slot, and position affirming poppet means coacting with said shifter means whereby the shifter means is sustained in any one of the three positions of said lever in said slot.

24. In planetary gearing, for motor vehicle drives, in combination, a driving shaft, a driven shaft, a transmission assembly adapted to transmit power therebetween including a low speed sun gear, a second speed sun gear, an output sun gear fixedly rotating with said driven shaft, a carrier supporting multiple planet gears meshing with the said sun gears; clutch means arranged to connect said driving shaft with said low or with said second speed sun gears, automatic clutch means adapted to permit said low speed sun gear to idle when said second speed sun gear is driving, one-way clutch means to prevent retrograde rotation of said carrier when said low or second speed sun gears are transmitting drive, clutch means arranged to couple said carrier for two-way drive directly with said driven shaft while said first named clutch means maintains two-way drive between said second speed sun gear and said driving shaft, and two-way braking means for said carrier effective when locked to provide engine braking when said second speed sun gear is locked.

25. A mechanism for controlling the driving force of an automotive propulsion unit of an automotive vehicle embodying an auxiliary power unit having a fluid pressure motor arranged to effect by the action of said power unit, a solid, positive, two-way driving connection at one speed ratio between the propulsion unit and a driven load carrying member of the vehicle, and is arranged for admitting the fluid pressure to said auxiliary power unit to effect by the action of the latter unit overrunning drive at the same, or at a different speed ratio from that operative when said positive two-way driving connection is in effect.

HOWARD A. FLOGAUS.
HAROLD E. FOX.